United States Patent
Orihara et al.

(10) Patent No.: US 9,711,856 B2
(45) Date of Patent: Jul. 18, 2017

(54) ELECTRONIC DEVICE AND COIL MODULE

(71) Applicant: DEXERIALS CORPORATION, Tokyo (JP)

(72) Inventors: Katsuhisa Orihara, Tochigi (JP); Norio Saito, Tochigi (JP); Akihiro Fukuda, Tochigi (JP); Hiroyuki Ryoson, Tochigi (JP); Masayoshi Kanno, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/436,723

(22) PCT Filed: Oct. 16, 2013

(86) PCT No.: PCT/JP2013/078084
§ 371 (c)(1),
(2) Date: Apr. 17, 2015

(87) PCT Pub. No.: WO2014/061702
PCT Pub. Date: Apr. 24, 2014

(65) Prior Publication Data
US 2016/0013555 A1    Jan. 14, 2016

(30) Foreign Application Priority Data
Oct. 17, 2012    (JP) .................. 2012-230267

(51) Int. Cl.
*H01Q 7/08*    (2006.01)
*H01Q 7/06*    (2006.01)
(Continued)

(52) U.S. Cl.
CPC ......... *H01Q 7/06* (2013.01); *G06K 19/07783* (2013.01); *H01Q 1/24* (2013.01);
(Continued)

(58) Field of Classification Search
CPC .......... H01Q 1/243; H01Q 7/06; H01Q 1/248; H01Q 1/38; H01Q 1/24
(Continued)

(56) References Cited

U.S. PATENT DOCUMENTS

2009/0008460 A1    1/2009    Kato
2009/0121030 A1    5/2009    Kato et al.
(Continued)

FOREIGN PATENT DOCUMENTS

JP    2005-070855 A    3/2005
JP    2005-303541 A    10/2005
(Continued)

OTHER PUBLICATIONS

May 9, 2016 Extended Search Report issued in European Patent Office Application No. 13846568.7.
(Continued)

*Primary Examiner* — Dieu H Duong
(74) *Attorney, Agent, or Firm* — Oliff PLC (57) ABSTRACT

An electronic device incorporated with a coil module that achieves favorable communication characteristics is provided. In an electronic device incorporated with a coil module, the coil module includes a loop coil wounded in a planar shape and a sheet-shaped magnetic sheet which is formed of a magnetic material and which overlaps with a part of the loop coil, and the magnetic sheet is arranged on at least one side extending from a center of the loop coil.

18 Claims, 9 Drawing Sheets

(51) Int. Cl.
  *H01Q 1/24* (2006.01)
  *G06K 19/077* (2006.01)
  *H01Q 1/38* (2006.01)
  *H04B 5/00* (2006.01)
  *H04M 1/02* (2006.01)

(52) U.S. Cl.
  CPC .............. *H01Q 1/243* (2013.01); *H01Q 1/248* (2013.01); *H01Q 1/38* (2013.01); *H04B 5/0037* (2013.01); *H04B 5/0081* (2013.01); *H04M 1/026* (2013.01)

(58) Field of Classification Search
  USPC ........................................ 343/787, 788, 702
  See application file for complete search history.

(56) References Cited

U.S. PATENT DOCUMENTS

| | | |
|---|---|---|
| 2010/0237152 A1 | 9/2010 | Kato |
| 2011/0234014 A1 | 9/2011 | Kato et al. |
| 2011/0275318 A1 | 11/2011 | Sato et al. |
| 2011/0287818 A1 | 11/2011 | Ikuta |
| 2012/0098711 A1* | 4/2012 | Yosui .............. G06K 7/10336 343/702 |
| 2012/0267438 A1 | 10/2012 | Kato et al. |
| 2013/0012127 A1 | 1/2013 | Orihara et al. |
| 2013/0214049 A1 | 8/2013 | Kato et al. |

FOREIGN PATENT DOCUMENTS

| | | |
|---|---|---|
| JP | 2006-113944 A | 4/2006 |
| WO | 2009/005080 A1 | 1/2009 |
| WO | 2011/125850 A1 | 10/2011 |

OTHER PUBLICATIONS

Jan. 14, 2014 International Search Report issued in International Application No. PCT/JP2013/078084.

* cited by examiner

ELECTRONIC DEVICE AND COIL MODULE

TECHNICAL FIELD

The invention relates to an electronic device which is incorporated with a coil module including a loop coil and a magnetic sheet. This application is claims the priority based on Japanese Patent Application No. 2012-230267 filed on Oct. 17, 2012 in Japan, the entire contents of which are incorporated herein by reference.

BACKGROUND ART

RF antennas such as an antenna for telephone communication, an antenna for GPS, an antenna for wireless LAN/ BLUETOOTH (registered trademark), and RFID (Radio Frequency Identification) are mounted in a wireless communication device in recent years. In addition to the above antennas, a loop coil for transmitting power has also been mounted with introduction of non-contact charging. As power transmission methods used for the non-contact charging, there are an electromagnetic induction method, a radio wave reception method, a magnetic resonance method, and the like. All of these methods use electromagnetic induction and/or magnetic resonance between a primary coil and a secondary coil. For example, electromagnetic induction is used in Qi standard for non-contact charging and NFC (Near Field Communication) standard of RFID.

In an antenna module, it is required for an antenna coil to receive magnetic flux equal to or greater than a certain value from a transmitter of a reader/writer or the like in order to reliably perform communication. Therefore, in an antenna module according to a conventional example, a loop coil is provided in a housing of a mobile phone and the coil receives the magnetic flux from the reader/writer.

For example, as a method for improving the characteristics of a loop antenna included in a mobile terminal device, Patent Document 1 proposes a method of arranging a flexible cable and a flat cable around a built-in battery.

PRIOR ART DOCUMENT

Patent Document

Patent Document 1: Unexamined Japanese Patent Publication No. 2005-303541

SUMMARY OF THE INVENTION

Problems to be Solved by the Invention

In the invention described in Patent Document 1, an antenna is arranged in a clearance in a housing, so it is difficult to form the antenna in a constant shape and the amount of change of inductance is large, so that there is a problem that a variation of resonance frequency is large.

In particular, when the antenna is formed by a flexible cable, in the invention described in Patent Document 1, it is difficult to adjust distributed capacitance between wirings, so that there is a problem that a lot of man-hours are required to adjust the resonance frequency.

Further, the loop coil has a problem that magnetic fluxes from the reader/writer which pass through the loop coil generate currents in directions opposite to each other on one side of the loop coil in which a coil conductor moves around in one direction and on the other side of the loop coil in which the coil conductor moves around in the other direction and the loop coil cannot be efficiently coupled.

The present invention is proposed in view of the above situation, and an object of the present invention is to provide an electronic device which is incorporated with a coil module that can achieve favorable communication characteristics, and a coil module.

Means to Solve the Problems

In order to solve the foregoing problems, an electronic device according to the present invention is an electronic device incorporated with a coil module, the coil module including a loop coil wounded in a planar shape and a sheet-shaped magnetic sheet which is formed of a magnetic material and which overlaps with a part of the loop coil, and the magnetic sheet being arranged on at least one side of a center of the loop coil.

In addition, the coil module according to the present invention is a coil module arranged so that a part of the coil module is overlapped with an internal structure arranged inside an electronic device housing. The coil module includes a loop coil wounded in a planar shape and a sheet-shaped magnetic sheet which is formed of a magnetic material and which overlaps with a part of the loop coil. The magnetic sheet is arranged on at least one side of a center of the loop coil.

According to the present invention, in the coil module, the magnetic sheet is overlapped with the one side of the center of the loop coil, so that it is possible to efficiently draw in magnetic fluxes on the one side and relatively lower the amount of current in a direction opposite to a direction of current generated on the one side by reducing power generation efficiency on the other side. Thereby, the coil module has favorable communication characteristics.

DESCRIPTION OF THE EMBODIMENTS

Hereinafter, an electronic device to which the present invention is applied will be described in detail with reference to the drawings. Note that it is a matter of course that the present invention is not limited to the embodiment described below and can be variously changed without departing from the scope of the present invention. In addition, the drawings are schematic and the ratios of dimensions and the like may be different from the actual ratios. Specific dimensions and the like should be determined by considering the description below. In addition, it is a matter of course that the drawings include portions whose relationships of dimensions and/or ratios are different from those of portions of other drawings.

[Configuration of Antenna Device]

Figure 1:
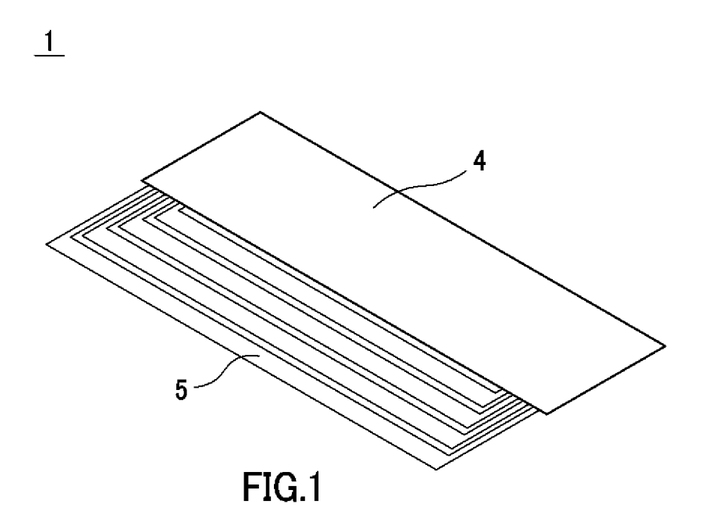
FIG. 1 is a perspective view showing a coil module to which the present invention is applied.
Figure 2A:
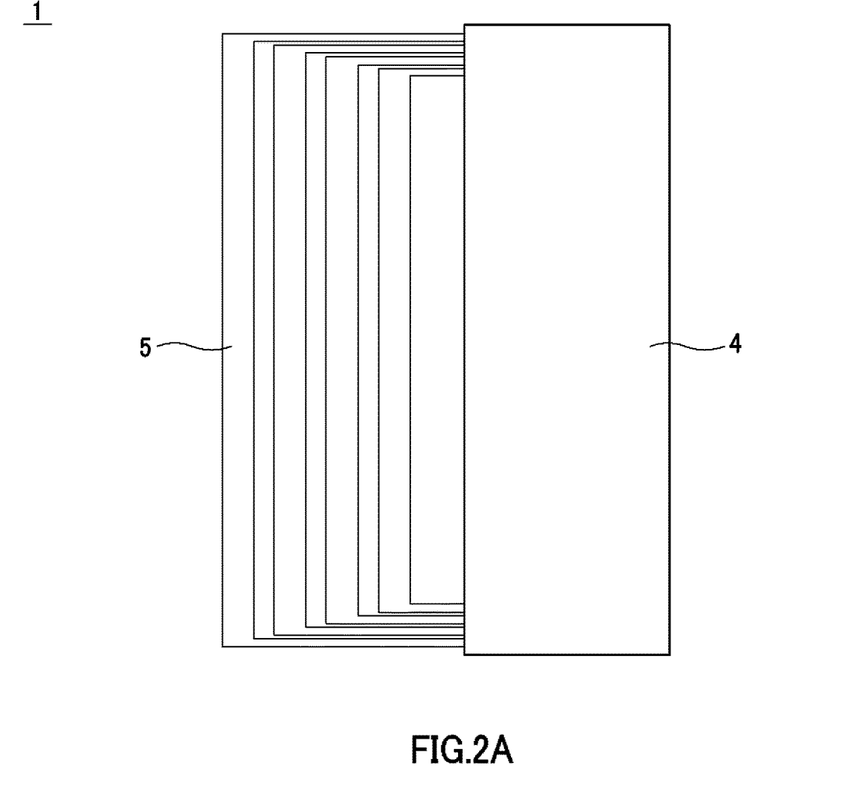
FIG. 2A is a plan view of a coil module to which the present invention is applied.
Figure 2B:
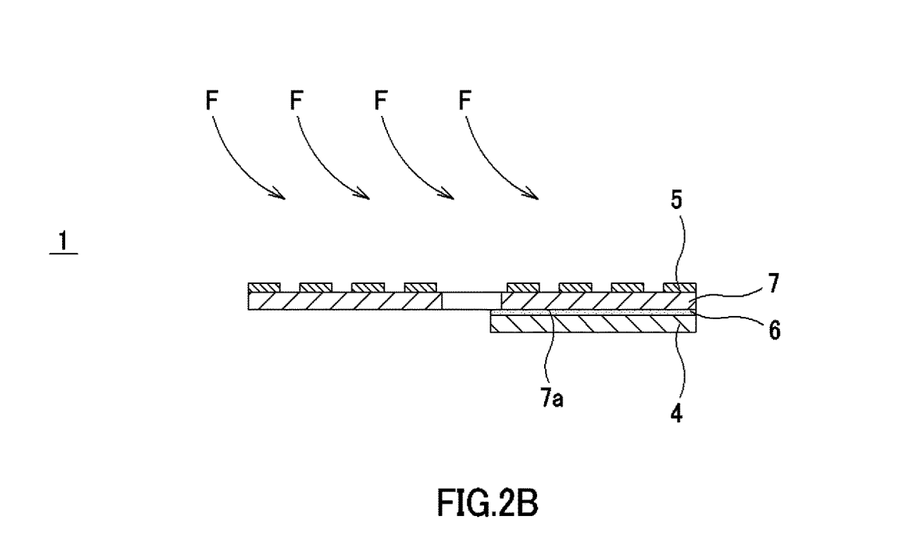
FIG. 2B is a cross-sectional view of the coil module.

An electronic device to which the present invention is applied is, for example, a mobile electronic device such as a mobile phone and is incorporated with a coil module 1. The coil module 1 achieves a near field communication function. Specifically, as shown in FIGS. 1 and 2, the coil module 1 to which the present invention is applied is a module for RFID such as NFC and includes a sheet-shaped magnetic sheet 4 formed of a magnetic material and a spiral-coil-shaped antenna coil 5 which is wounded in a planar shape and to which the magnetic sheet 4 is adhered.

The magnetic sheet 4 is formed of, for example, a sintered body of NiZn-based ferrite. The magnetic sheet 4 is formed by sintering ferrite particles applied in a thin sheet in a high temperature environment into a sheet and thereafter demolding the sheet into a predetermined shape. Alternatively, the magnetic sheet 4 can be formed by applying ferrite particles in a sheet that is identical to the final shape in advance and sintering the ferrite particles. In addition, it is also possible to obtain a predetermined shape of the magnetic sheet 4 by stuffing ferrite particles into a mold having a rectangular cross section, sintering the ferrite particles into a rectangular parallelepiped having a rectangular shape in plan view, and thinly slicing the sintered body.

It is noted that the magnetic sheet 4 may include magnetic particles formed of soft magnetic powder and a resin that serves as a binder.

As the magnetic particles, particles of oxide magnetic body such as ferrite, crystal-based magnetic body or microcrystal-based magnetic body of Fe-based magnetic body such as sendust and permalloy, Co-based, Ni-based, Fe—Ni-based, Fe—Co-based, Fe—Al-based, Fe—Si-based, Fe—Si—Al-based, Fe—Ni—Si—Al-based, and the like or amorphous metal magnetic body such as Fe—Si—B-based, Fe—Si—B—C-based, Co—Si—B-based, Co—Zr-based, Co—Nb-based, Co—Ta-based magnetic body, and the like can be used.

Of these, as the magnetic sheet 4 used for the antenna module for RFID such as NFC, the aforementioned NiZn-based ferrite that serves as a binder is preferably used.

As the binder, a resin and the like that is cured by heat, ultraviolet irradiation, and the like can be used. As the binder, known materials such as, for example, resins such as an epoxy resin, a phenol resin, a melamine resin, a urea resin, an unsaturated polyester or the like, a silicone rubber, a urethane rubber, an acrylic rubber, a butyl rubber and an ethylene-propylene rubber can be used. Regarding the binder, an appropriate amount of surface preparation agent such as flame retardant, reaction conditioning agent, cross-linking agent, or silane coupling agent may be added to the aforementioned resins or rubbers.

It is noted that the magnetic sheet 4 may be not only formed of a single magnetic material, but also formed by mixing two or more types of magnetic materials, or may be formed by laminating in multilayer. In addition, even when the magnetic sheet 4 is formed of a single magnetic material, the magnetic sheet 4 may be formed by selecting and mixing particle diameters and/or shapes of magnetic particles, or may be formed by laminating in multilayer.

The antenna coil 5 is formed by forming a conductive pattern formed of Cu foil or the like on a flexible substrate 7 formed of polyimide or the like in a spiral coil. The flexible substrate 7 is formed into a substantially rectangular shape and the antenna coil 5 that moves around in a substantially rectangular shape along outer side edges of the flexible substrate 7 is formed on the flexible substrate 7.

The magnetic sheet 4 is overlapped on one surface 7a of the flexible substrate 7 through an adhesive layer 6. As the adhesive layer 6, a known material such as an adhesive agent and an adhesive tape can be used. In addition, the magnetic sheet 4 is overlapped with at least a part of the antenna coil 5. Thereby, the coil module 1 efficiently draws magnetic fluxes into the antenna coil 5, is magnetically coupled with a reader/writer by inductive coupling, and receives modulated electromagnetic waves. A received signal is supplied to a memory through a terminal portion connected to the antenna coil 5.

[Configuration of Present Invention]

Here, the magnetic sheet 4 is formed into a substantially rectangular shape according to the shape of the flexible substrate 7 and is overlapped with at least one side extending from the center of the antenna coil 5 in the width direction. Thereby, in the coil module 1, a coupling efficiency is more improved on the one side in the width direction with which the magnetic sheet 4 is overlapped than on the other side in the width direction with which the magnetic sheet 4 is not overlapped.

Here, as shown in FIGS. 2A and 2B, in the coil module 1, magnetic fluxes F from the reader/writer which pass through the antenna coil 5 generate currents in directions opposite to each other on one side of the antenna coil 5 in which a coil conductor moves around in one direction and on the other side of the antenna coil 5 in which the coil conductor moves around in the other direction and the coil module 1 cannot be efficiently coupled with the reader/writer.

However, in the coil module 1, the magnetic sheet 4 is overlapped with one side in the width direction from the center of the antenna coil 5, so that it is possible to efficiently draw in the magnetic fluxes on the one side and relatively lower the amount of current in a direction opposite to a direction of current generated on the one side by reducing power generation efficiency on the other side in the width direction. This makes it possible for the coil module 1 to have favorable communication characteristics.

Note that although overlapping of the magnetic sheet 4 with only a part of the one side in the width direction from a winding center of the antenna coil 5 makes it possible to achieve the effect described above, it is preferable that the magnetic sheet 4 is overlapped with the entire area of the one side.

Figure 3:
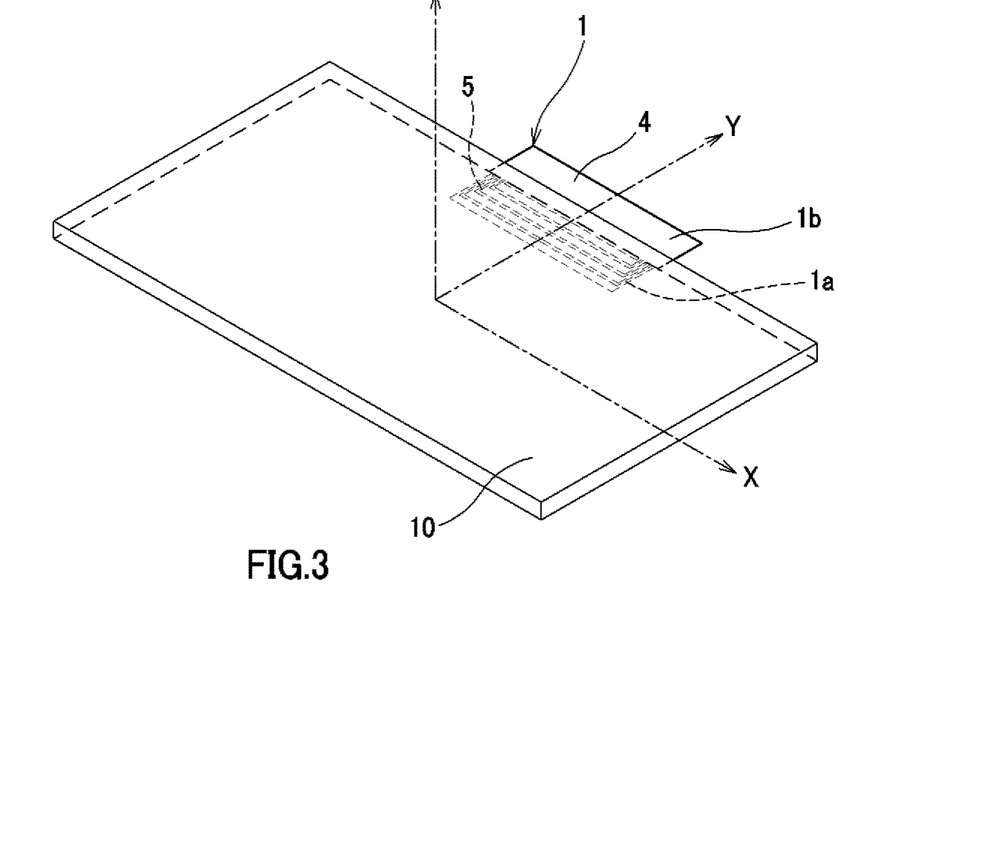
FIG. 3 is a perspective view showing the inside of an electronic device to which the present invention is applied.
Figure 4:
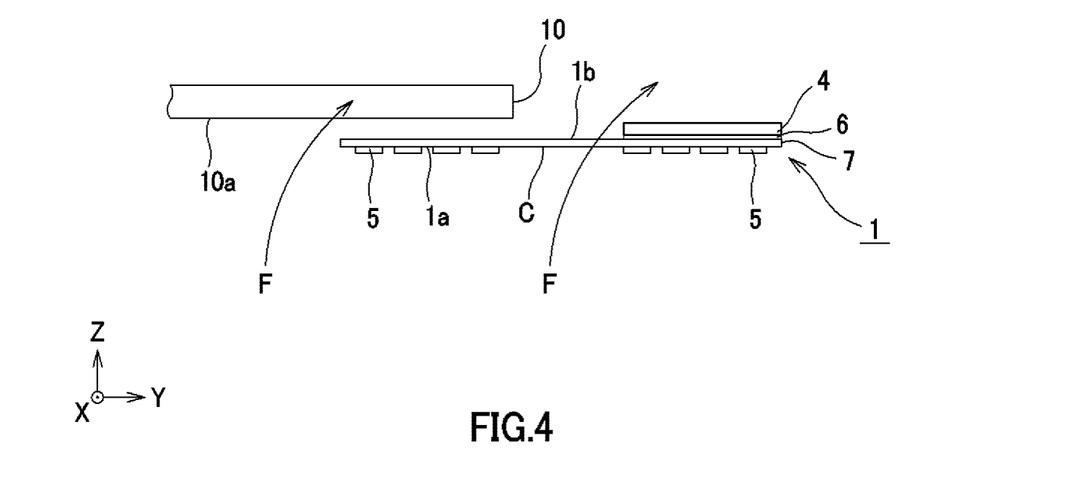
FIG. 4 is a cross-sectional view showing the inside of the electronic device to which the present invention is applied.

As shown in FIGS. 3 and 4, when the coil module 1 is incorporated into a housing of the electronic device, the coil module 1 has an overlap portion 1a where a part of the antenna coil 5 also overlaps with an internal structure 10 of the electronic device housing and an extension portion 1b that extends outward from a main surface 10a of the internal structure 10.

Here, the internal structure 10 has the main surface 10a facing a reader/writer that performs communication, and the sheet-shaped coil module 1 is arranged to overlap with the main surface 10a. In other words, the coil module 1 is arranged so that a part of the flexible substrate 7 where the antenna coil 5 is formed overlaps with the internal structure 10 such as a battery can provided in the electronic device housing and the flexible substrate 7 extends outward from an outer edge of the structure 10. Thereby, in the coil module 1, a part of the antenna coil 5 overlaps with the internal structure 10 and the other part of the antenna coil 5 does not overlap with the internal structure 10.

It is preferable that the magnetic sheet 4 is overlapped with one side of the antenna coil 5 that does not overlap with the internal structure 10 on an antenna coil 5 surface side that overlaps with the internal structure 10. In particular, when the internal structure 10 is a metal body such as a battery can, in the coil module 1, magnetic field components are possibly interfered with (coupled with) the metal body on the other side in the width direction of the antenna coil 5 that overlaps with the internal structure 10 and the inductance of the antenna coil 5 substantially reduces, and thereby the resonance frequency is shifted, and the receiving sensitivity is possibly lowered by the substantial reduction of the inductance. On the other hand, in the coil module 1, on the one side in the width direction of the antenna coil 5 with which the magnetic sheet 4 is overlapped, there is no interference with the metal body and it is possible to efficiently draw in the magnetic fluxes as described above.

Thereby, it is possible for the coil module 1 to relatively reduce the amount of current in a direction opposite to a direction of a current generated in the extension portion 1b by preventing the coupling in the overlap portion 1a, guide the magnetic fluxes from the overlap portion 1a to the extension portion 1b by the magnetic sheet 4, expedite the coupling in the extension portion 1b, and improve the communication characteristics.

In addition, in the coil module 1, the magnetic sheet 4 provided on the extension portion 1b does not overlap with the internal structure 10 such as a battery can, so that in the electronic device housing, only the flexible substrate 7 where the antenna coil 5 is formed overlaps with the internal structure 10 and the magnetic sheet 4 does not overlap with the internal structure 10 in the coil module 1. Therefore, thinning of the electronic device housing is enabled by the thickness of the magnetic sheet 4 and the adhesive layer in the thickness direction of the internal structure 10.

[Other Configuration 1]

Alternatively, it is preferable that in the coil module 1, the entire area on the other side of the center of the antenna coil 5 overlaps with the internal structure 10. This allows the coil module 1 to reduce the amount of current on the other side of the antenna coil 5 as much as possible. In other words, it is possible to reduce as much as possible the current in the opposite direction of that of the current in the one side of the antenna coil 5.

[Other Configuration 2]

Alternatively, It is preferable that in the coil module 1, the center of the antenna coil 5 is positioned at an outer edge of the internal structure 10 and the magnetic sheet 4 is provided in a position that does not overlap with the internal structure 10 on an antenna coil 5 surface side that overlaps with the internal structure 10, that is, the magnetic sheet 4 is provided on the extension portion 1b.

This makes it possible for the one side of the antenna coil 5 to which the magnetic sheet 4 is adhered to be not affected by the metal body and efficiently draw in the magnetic fluxes by the magnetic sheet 4.

[Near Field Communication System]

Figure 5:
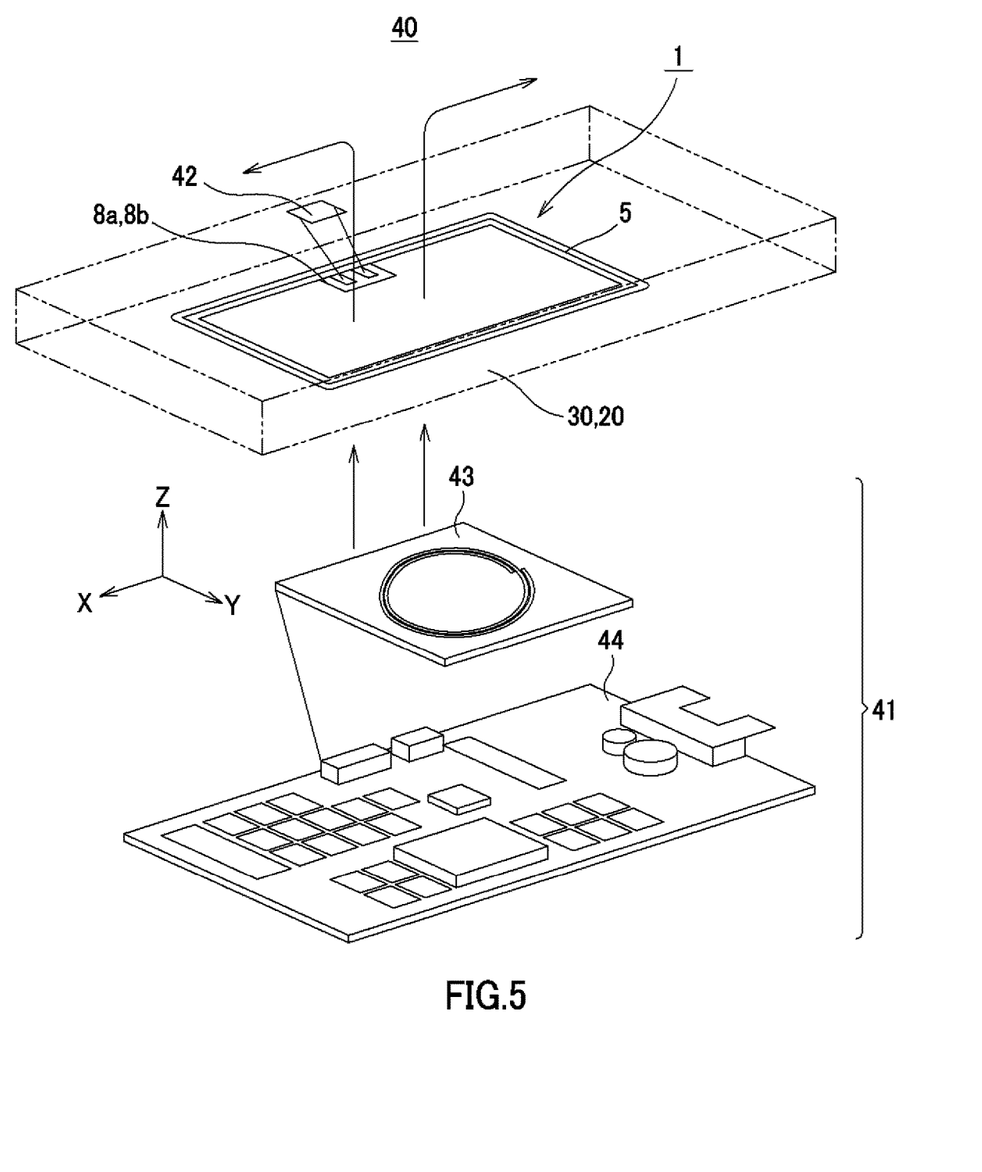
FIG. 5 is a perspective view showing a schematic configuration of a wireless communication system.

Next, the near field communication function of the coil module 1 will be described. For example, as shown in FIG. 5, the coil module 1 is incorporated in the housing 20 of the mobile phone 30, and the coil module 1 is used as the wireless communication system 40 for RFID.

The wireless communication system 40 is a system in which the reader/writer 41 accesses the memory module 42 incorporated in the mobile phone 30 along with the coil module 1. Here, it is assumed that the coil module 1 and the reader/writer 41 are arranged to face each other in an xy plane in a three-dimensional rectangular coordinate system xyz.

The reader/writer 41 functions as a transmitter that transmits a magnetic field in the z axis direction to the antenna coil 5 of the coil module 1 facing the reader/writer 41 in the xy plane. Specifically, the reader/writer 41 includes an antenna 43 that transmits a magnetic field to the antenna coil 5 and the control substrate 44 that communicates with the memory module 42.

In other words, the reader/writer 41 is provided with the control substrate 44 electrically connected to the antenna 43. On the control substrate 44, a control circuit including electronic components such as one or more integrated circuit chips. The control circuit performs various processing based on data received from the memory module 42 through the antenna coil 5. For example, when the control circuit transmits data to the memory module 42, the control circuit encodes the data, modulates a carrier wave of a predetermined frequency (for example, 13.56 MHz) based on the encoded data, amplifies the modulated modulation signal, and drives the antenna 43 by the amplified modulation signal. In addition, when the control circuit reads data out from the memory module 42, the control circuit amplifies a modulation signal of the data received by the antenna 43, demodulates the amplified modulation signal of the data, and decodes the demodulated data. It is noted that in the control circuit, an encoding method and a modulation method employed by a general reader/writer are employed. For example, Manchester coding and ASK (Amplitude Shift Keying) modulation method are employed.

In the coil module 1, the antenna coil 5 receives a magnetic field transmitted from the reader/writer 41, inductively couples with the reader/writer 41, and supplies a signal to the memory module 42 that serves as storage medium included in the mobile phone 30.

When the antenna coil 5 receives a magnetic field transmitted from the reader/writer 41, the antenna coil 5 is magnetically coupled with the reader/writer 41 by inductive coupling and the antenna coil 5 receives a modulated electromagnetic wave and supplies the received signal to the memory module 42 through the terminal portions 8a and 8b.

The memory module 42 is driven by a current flowing through the antenna coil 5 and communicates with the reader/writer 41. Specifically, the memory module 42 demodulates a received modulation signal, decodes the demodulated data, and writes the decoded data to an internal memory included in the memory module 42. Further, the memory module 42 reads out data to be transmitted to the reader/writer 41 from the internal memory, encodes the read data, modulates a carrier wave based on the encoded data, and transmits the modulated radio wave to the reader/writer 41 through the antenna coil 5 magnetically coupled with the reader/writer 41 by inductive coupling.

Hereinafter, while a case has been described in which the coil module 1 according to the present invention is applied to an antenna module for RFID, the present invention may be applied to, for example, a module for non-contact charging such as Qi and other antenna modules in addition to the antenna module for RFID.

[Example]

Figure 7:
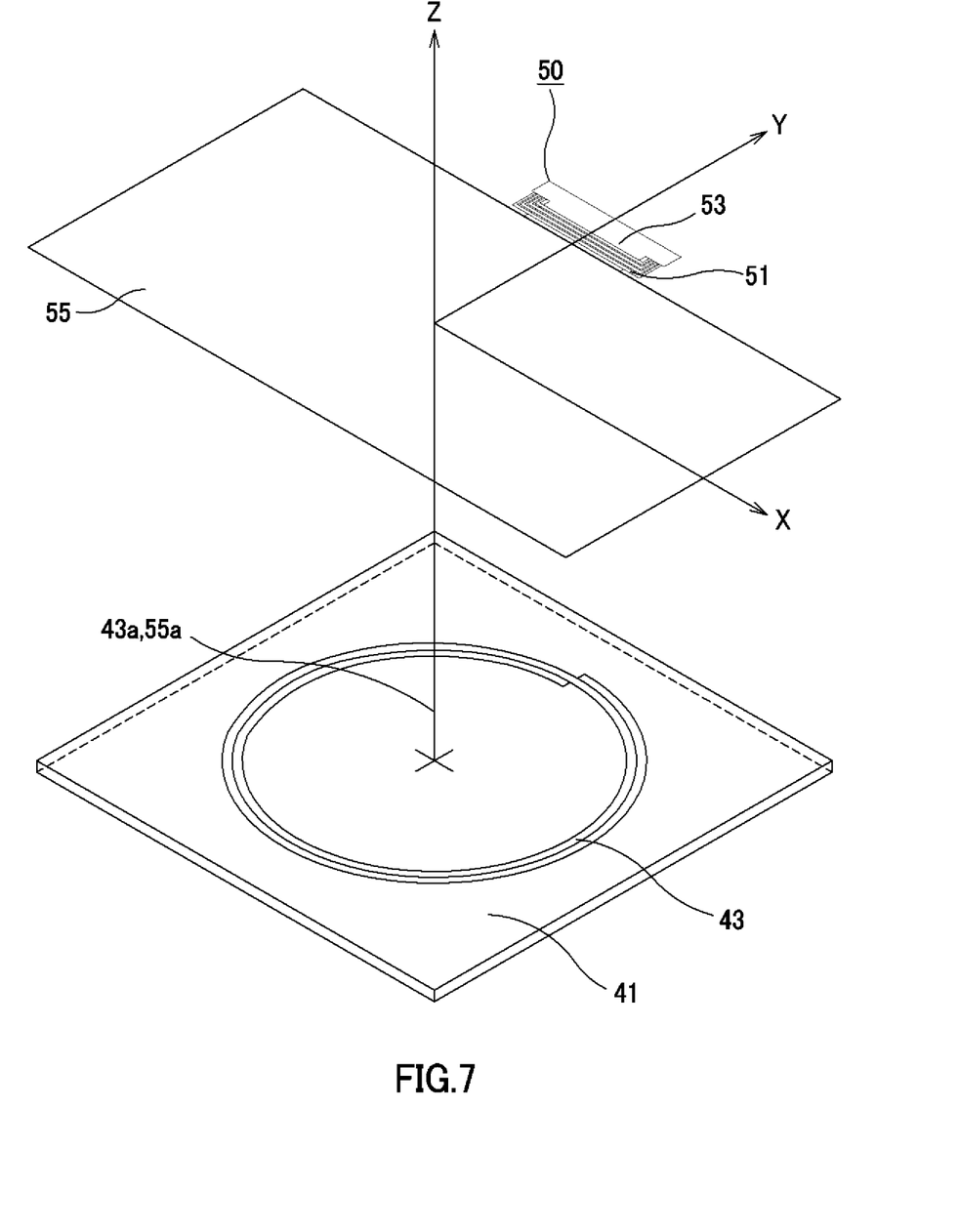
FIG. 7 is a perspective view showing a configuration of the comparative example.
Figure 10:
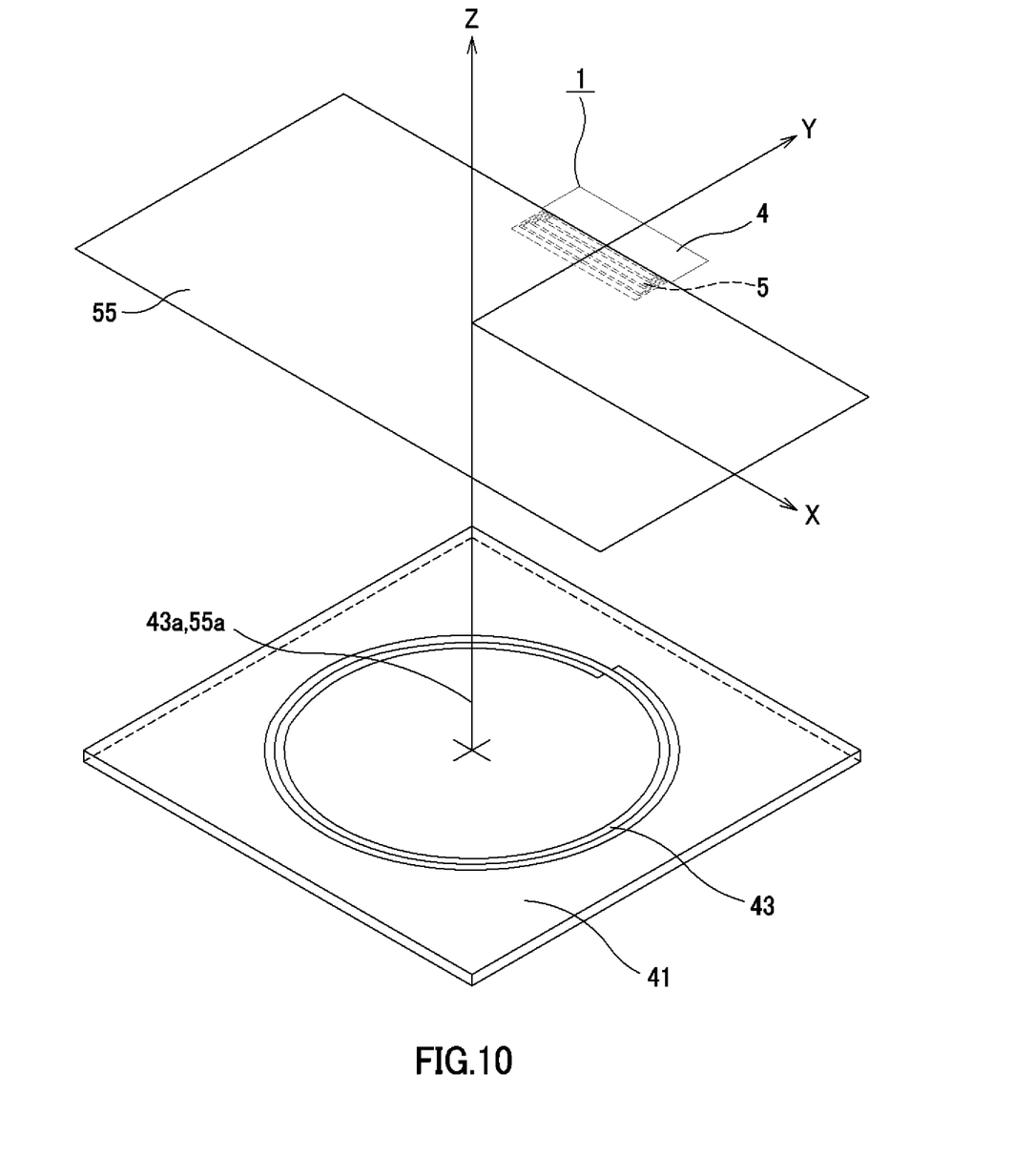
FIG. 10 is a perspective view showing a configuration of the example.

Next, the coil module 1 to which the present invention is applied will be described by comparing with a conventional coil module. For both the example and a comparative example, as shown in FIGS. 7 and 10, a variation of a value "k" when the coil module is arranged to face the reader/writer and the reader/writer is gradually moved in the Y axis direction indicated by an arrow in FIGS. 7 and 10 is obtained by simulation.

<Comparative Example>

Figure 6:
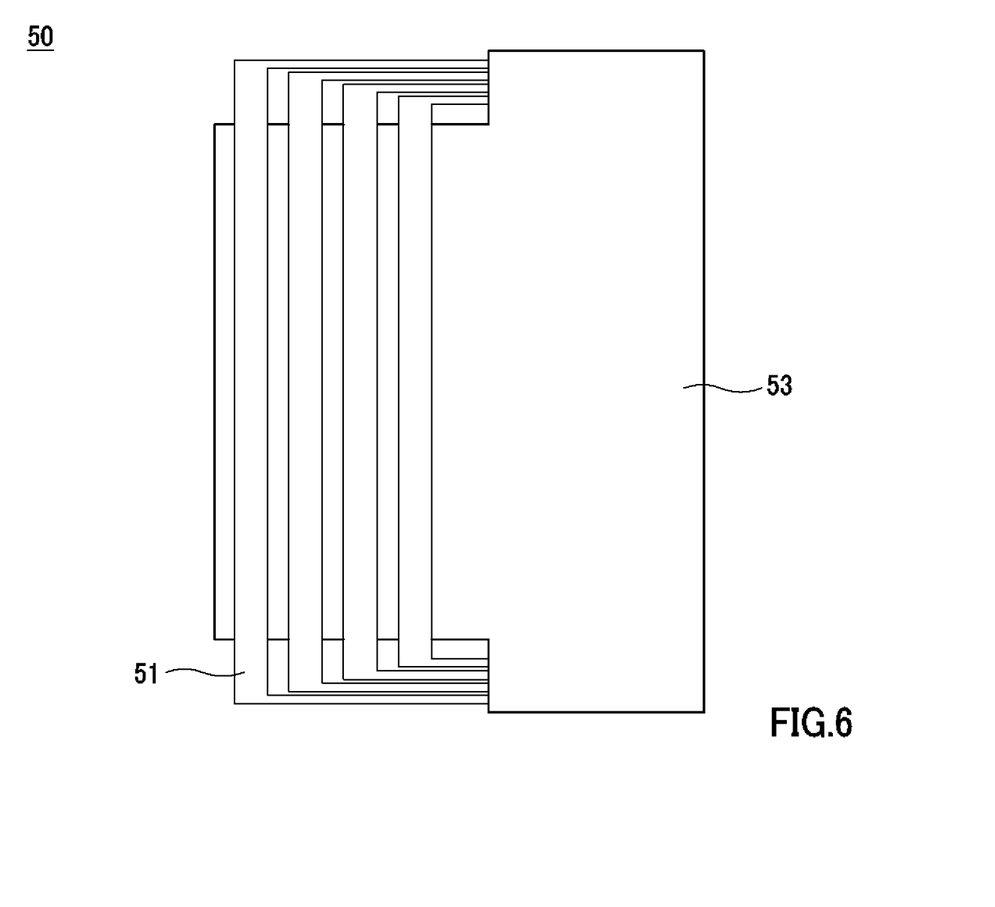
FIG. 6 is a plan view showing a coil module according to a comparative example.

As shown in FIG. 6, the coil module 50 according to the comparative example includes the antenna coil 51 formed along an outer side edge of the flexible substrate and the magnetic sheet 53 that draws the magnetic fluxes into the antenna coil 51, and the magnetic sheet 53 was inserted into the center of the antenna coil 5. In addition, the coil module 50 was arranged so that one side of side edges in the longitudinal direction facing each other was adjacent to the metal plate 55 that was regarded as the internal structure 10, and the coil module 50 along with the metal plate 55 faces the reader/writer 41.

The magnetic sheet 4 had substantially the same width as that of the antenna coil 51 and was overlapped with substantially the entire area of the antenna coil 51. In addition, regarding the magnetic sheet 4, the magnetic sheet 4 was arranged on the side facing the reader/writer 41 at the metal plate 55 side through the center of the antenna coil 51, and the antenna coil 51 was arranged on the side facing the reader/writer 41 at the opposite side to the metal plate 55 through the center of the antenna coil 51.

The communication characteristics in cases in which the relative positional relationship between the coil module 50 and the reader/writer 41 was changed from a predetermined position where the coil module 50 and the reader/writer 41 face each other were evaluated.

Specific evaluation conditions were as follows. The antenna 43 of the reader/writer 41 was a 1.5-mm-pitch two-winding coil having an external dimension of 70 mm×70 mm, which was defined in the xy axis direction. The antenna coil 51 of the coil module 50 was a 1 mm pitch four-winding coil having an external dimension of 30 mm×10 mm, which was defined in the xy axis direction. The magnetic sheet 53 of the coil module 50 was a ferrite sheet having a thickness of 0.2 mm and an impermeability of 120, which was coated by a protective film, and was adhered to the entire surface of the antenna coil 51 through an adhesive layer.

The metal plate was stainless steel having an external dimension of 100 mm×50 mm, which was defined in the xy axis direction, and a thickness of 1.0 mm. In addition, the distance between the metal plate 55 and the antenna coil 51 was 1.0 mm.

Further, the distance from the antenna 43 of the reader/writer 41 to the antenna coil 51 defined in the z axis direction was 40 mm.

Here, as a value that represents a relative positional relationship between the reader/writer 41 and the antenna coil 51, "a" described below was used. When an axis line 43a in the z axis direction passing through the center of the antenna 43 of the reader/writer 41 and an axis line 55a in the z axis direction passing through the center of the metal plate 55 are assumed, the "a" was a distance between the two axes lines 43a and 55a when the reader/writer 41 was moved in the Y direction indicated by an arrow in FIG. 7 and a direction opposite to the Y direction indicated by the arrow from a position where the two axes lines 43a and 55a coincide with each other and which was defined as 0 (mm).

Figure 8:
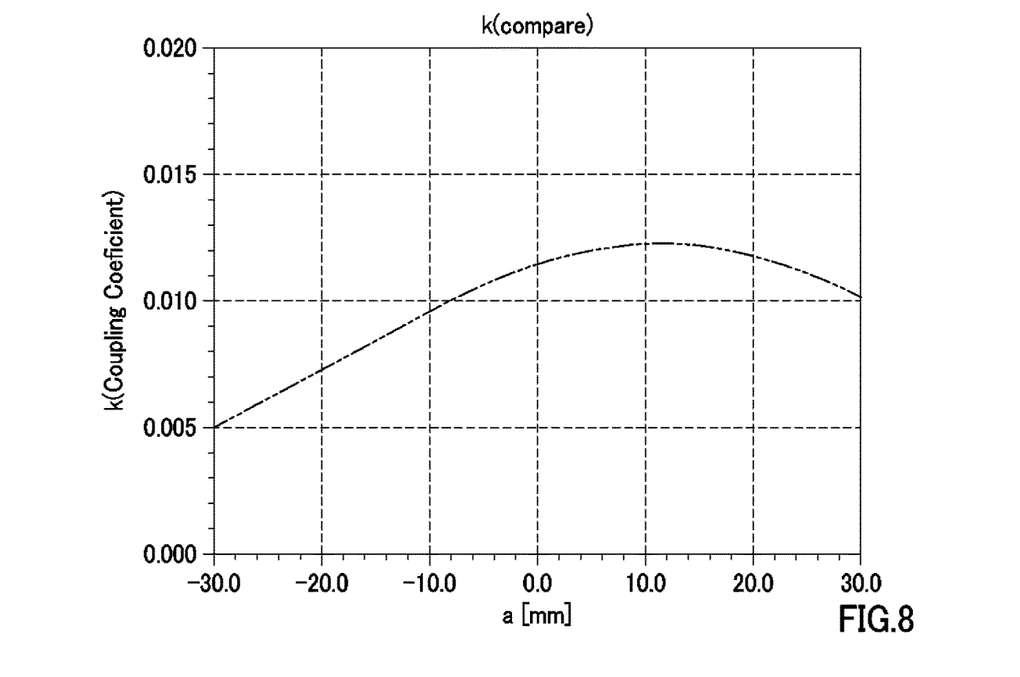
FIG. 8 is a graph showing a correlation between a coupling coefficient and a moving distance of a reader/writer of the comparative example.

Under the condition as described above, the coupling coefficient of the antenna coil 51 when the value of "a" was varied from −30 mm to +30 mm was obtained by simulation. The variation of the coupling coefficient is shown in FIG. 8.

<Example>

Figure 9:
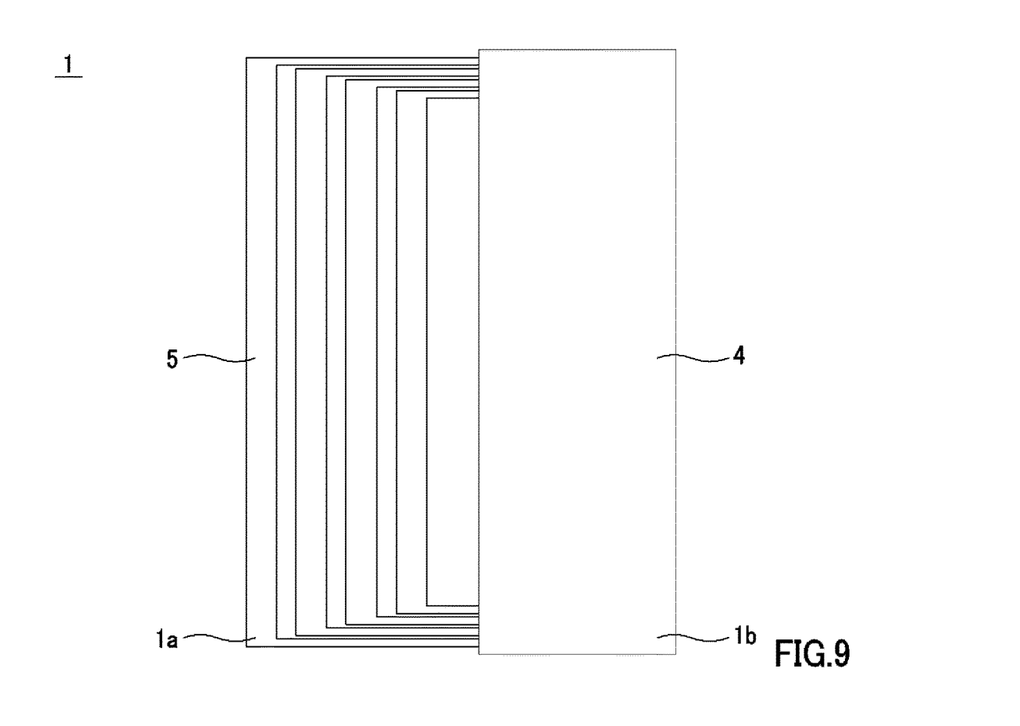
FIG. 9 is a plan view showing a coil module according to an example.

In the example, as shown in FIG. 9, the coil module 1 in which the magnetic sheet 4 was adhered to one side of the center of the antenna coil 5 was used. In the coil module 1, the other side extending from the center of the antenna coil 5 was the overlap portion 1a that overlaps with the metal plate 55, the center of the antenna coil 5 was positioned at an outer edge of the metal plate 55, and the one side extending from the center of the antenna coil 5 was the extension portion 1b that extends from the metal plate 55. The magnetic sheet 4 was adhered to the entire area of the extension portion 1b on the one side extending from the center of the antenna coil 5.

Further, also in the present example, the communication characteristics were evaluated when the relative positional relationship between the coil module 1 and the reader/writer 41 was changed while causing the coil module 1 and the reader/writer 41 to face each other.

The specific evaluation conditions regarding the reader/writer 41, the metal plate 55, and the distance from the antenna 43 of the reader/writer 41 to the antenna coil 5 were identical to those of the comparative example described above. The antenna coil 5 of the coil module 1 was a 1.5-mm-pitch four-winding coil having an external dimension of 30 mm×20 mm, which was defined in the xy axis direction. As the magnetic sheet 4, a ferrite sheet was used which had an impermeability of 120, a thickness of 0.2 mm, and an external dimension of 30 mm×10 mm defined in the xy axis direction, which were identical to those of the magnetic sheet 52 according to the comparative example and which was coated by a protective film. The magnetic sheet 4 was adhered to the extension portion 1b of the coil module 1 through an adhesive layer.

As a value representing a relative positional relationship between the reader/writer 41 and the antenna coil 5, similarly to in the comparative example, when an axis line 43a in the z axis direction passing through the center of the antenna 43 of the reader/writer 41 and an axis line 55a in the z axis direction passing through the center of the metal plate 55 were assumed, a distance "a" between the two axes lines 43a and 55a when the reader/writer 41 was moved in the Y axis direction indicated by an arrow in FIG. 10 and a direction opposite to the Y axis direction indicated by the arrow from a position where the two axes lines 43a and 55a coincide with each other and which was defined as 0 (mm) was used.

Figure 11:
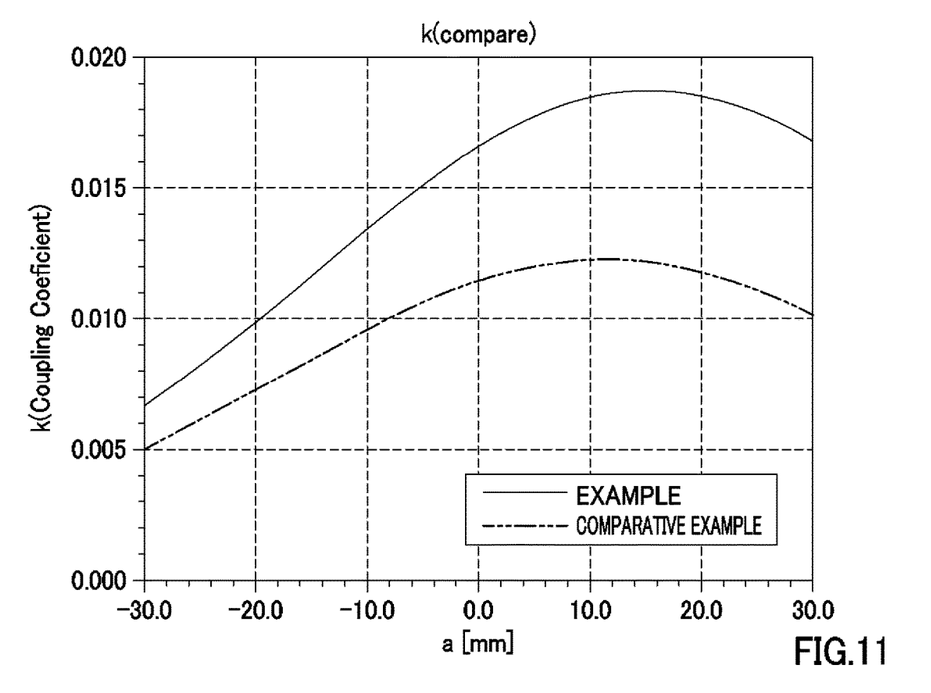
FIG. 11 is a graph showing a correlation between a coupling coefficient and a moving distance of a reader/writer of the example.

Under the condition as described above, the coupling coefficient of the antenna coil 5 when the value of "a" was changed from −30 mm to +30 mm was obtained by simulation. The variation of the coupling coefficient is shown in FIG. 11. According to the example, it is known that the coupling coefficient was improved as compared with the comparative example. This is partly because the size of the antenna coil 5 was large, so that the example is more advantageous than the comparative example. However, it can be said that the example has the coupling coefficient at least equal to or greater than the coupling coefficient of the comparative example.

This is because, according to the coil module 1 of the example, the amount of current in a direction opposite to that of the current on the one side of the antenna coil 5 to which the magnetic sheet 4 was adhered was decreased and the magnetic fluxes can be efficiently drawn in by the magnetic sheet 4.

In summary, the configuration of the example achieves favorable communication characteristics. Further, in the example, it is possible to provide an electronic device using a coil module which can be thinned in the thickness direction of the electronic device housing without overlapping the magnetic sheet 4 on the metal plate 55 and which can be mounted even in a narrowed space.

REFERENCE SYMBOLS 1 coil module, 1a overlap portion, 1b extension portion, 4 magnetic sheet, 5 antenna coil, 6 adhesive layer, 7 flexible substrate, 10 internal structure, 10a main surface, 20 electronic device housing, 20a side wall, 30 mobile phone, 40 wireless communication system, 41 reader/writer, 42 memory module, 43 antenna, control substrate, 45 battery can, 45a main surface

The invention claimed is:

1. An electronic device adapted to be partially inserted into an opening of a housing, comprising:
a coil module including a loop coil wound in a planar shape and a sheet-shaped magnetic sheet, the sheet-shaped magnetic sheet being formed of a magnetic material and being positioned to overlap with a part of the loop coil, wherein
the magnetic sheet is arranged on a first side of a center of the loop coil and is not arranged on a second side of the center of the loop coil opposite from the first side, and the electronic device is configured so that sheet-shaped magnetic sheet and the part of the loop coil overlapped therewith are positioned outside the housing when the electronic device is partially inserted into the housing and a part of the loop coil not overlapped with the sheet-shaped magnetic sheet is positioned inside the housing when the electronic device is partially inserted into the housing.

2. The electronic device according to claim 1, wherein the magnetic sheet is overlapped with an entire area of the first side of the loop coil.

3. The electronic device according to claim 2, wherein the coil module is arranged from a position where the loop coil overlaps with an internal structure of a housing to a position where the loop coil does not overlap with the internal structure.

4. The electronic device according to claim 3, wherein the magnetic sheet does not overlap with the internal structure.

5. The electronic device according to claim 4, wherein in the coil module, the other side extending from the center of the loop coil overlaps with the internal structure.

6. The electronic device according to claim 5, wherein in the coil module, the center of the loop coil is positioned to an outer edge of the internal structure.

7. The electronic device according to claim 3, wherein in the coil module, the other side extending from the center of the loop coil overlaps with the internal structure.

8. The electronic device according to claim 7, wherein in the coil module, the center of the loop coil is arranged to an outer edge of the internal structure.

9. The electronic device according to claim 3, wherein the internal structure is a metal body.

10. The electronic device according to claim 1, wherein the coil module is arranged from a position where the loop coil overlaps with an internal structure of a housing to a position where the loop coil does not overlap with the internal structure.

11. The electronic device according to claim 10, wherein the magnetic sheet does not overlap with the internal structure.

12. The electronic device according to claim 11, wherein in the coil module, the other side extending from the center of the loop coil overlaps with the internal structure.

13. The electronic device according to claim 12, wherein in the coil module, the center of the loop coil is positioned to an outer edge of the internal structure.

14. The electronic device according to claim 10, wherein in the coil module, the other side extending from the center of the loop coil overlaps with the internal structure.

15. The electronic device according to claim 14, wherein in the coil module, the center of the loop coil is arranged to an outer edge of the internal structure.

16. The electronic device according to claim 10, wherein the internal structure is a metal body.

17. A coil module arranged so that a part of the coil module is overlapped with an internal structure arranged inside an electronic device housing, the coil module comprising:
a loop coil wound in a planar shape; and
a sheet-shaped magnetic sheet which is formed of a magnetic material and which overlaps with a first part of the loop coil and does not overlap with a second part of the loop coil,
wherein the magnetic sheet is arranged on a first side of a center of the loop coil and is not arranged on a second side of the center of the loop coil opposite from the first side, and
the second part of the loop coil is positioned to overlap the internal structure arranged inside the electronic device housing, and the first part of the loop coil and the sheet-shaped magnetic sheet is positioned outside of the electronic device housing.

18. The coil module according to claim 17, wherein the magnetic sheet is overlapped with an entire area of the one side of the loop coil.

* * * * *